US007860313B2

(12) United States Patent
Walch

(10) Patent No.: US 7,860,313 B2
(45) Date of Patent: Dec. 28, 2010

(54) METHODS AND APPARATUSES FOR EXTENDING DYNAMIC HANDWRITING RECOGNITION TO RECOGNIZE STATIC HANDWRITTEN AND MACHINE GENERATED TEXT

(75) Inventor: Mark A. Walch, Woodbridge, VA (US)

(73) Assignee: Gannon Technologies Group, LLC, McLean, VA (US)

( * ) Notice: Subject to any disclaimer, the term of this patent is extended or adjusted under 35 U.S.C. 154(b) by 931 days.

(21) Appl. No.: 11/622,315

(22) Filed: Jan. 11, 2007

(65) Prior Publication Data

US 2007/0172125 A1 Jul. 26, 2007

Related U.S. Application Data

(60) Provisional application No. 60/758,078, filed on Jan. 11, 2006.

(51) Int. Cl.
*G06K 9/34* (2006.01)
(52) U.S. Cl. .................... 382/179; 382/190; 382/286
(58) Field of Classification Search .............. 382/179, 382/190, 286; 400/17; 347/5, 37; 345/169; 715/210
See application file for complete search history.

(56) References Cited

U.S. PATENT DOCUMENTS 4,150,902 A * 4/1979 Brescia ...................... 400/17
5,454,046 A 9/1995 Carman, II 5,860,075 A * 1/1999 Hashizume et al. ......... 715/210
5,926,567 A 7/1999 Collins et al.
5,940,535 A 8/1999 Huang

FOREIGN PATENT DOCUMENTS

WO 2004079526 A 9/2004

OTHER PUBLICATIONS

International Search Report and Written Opinion related to PCT/US07/60402 mailed Feb. 8, 2008.
Supplementary European Search Report for EP07710064.2 dated Jul. 23, 2009.
Yu Qiao et al. "Recovering Dynamic Information from Static Handwritten Images." Proceedings of the 9th Int'l Workshop on Frontiers in Handwriting Recognition (IWFHR-9 2004) in Tokyo, Japan Oct. 26-29, 2004. Piscataway, NJ, USA, IEEE, Oct. 26, 2004, pp. 118-123, XP010750389.
Jager S. "Recovering Writing Traces in Off-Line Handwriting Recognition: Using a Global Optimization Technique." Proceedings of the 13th International Conference on Pattern Recognition, IEEE Comput. Soc. Press, Los Alamitos, CA, USA, vol. 3, 1996, pp. 150-154, XP002538390.

(Continued)

*Primary Examiner*—Anh Hong Do
(74) *Attorney, Agent, or Firm*—Procopio Cory Hargreaves & Savitch LLP; Noel C. Gillespie

(57) ABSTRACT

A method for recognizing a character string on a static document is disclosed. The character string is extracted from the static document. The character string is converted into a representative character string graph. The common embedded isomorphic graphs are extracted from the representative character string graph. Each of the common embedded isomorphic graphs extracted are converted into digital ink files. The character string associated with each of the digital ink files are identified using a dynamic recognition system.

66 Claims, 12 Drawing Sheets

OTHER PUBLICATIONS

Tong Huang et al. "A Total Stroke SLALOM Method for Searching for the Optimal Drawing Order of Off-line Handwriting." Systems, Man and Cybernetics, 1995. Intelligent Systems for the 21st Century, IEEE International Conference on Vancouver, BC Canada, Oct. 22-25, 1995. New York, NY, USA, IEEE, US, vol. 3, Oct. 22, 1995, pp. 2789-2794, XP010194689.

Baati A E et al. "Recovery of Temporal Information from Off-Line Arabic Handwritten." Computer Systems and Applications, 2005. The 3rd ACS/IEEE International Conference on Cairo, Egypt, Jan 3-6, 2005. Piscataway, NJ, USA, IEEE, Jan. 3, 2005, pp. 683-688, XP010777734.

Allen C R et al. "The Recognition of Roman Hand-Written Characters Using Dynamic Information Recovery." Image Processing and Its Applications, 1997., Sixth International Conference on Dublin, Ireland, Jul. 14-17, 1997. London, UK, IEE, UK, vol. 2, Jul. 14, 1997, pp. 741-745, XP006508393.

\* cited by examiner

METHODS AND APPARATUSES FOR EXTENDING DYNAMIC HANDWRITING RECOGNITION TO RECOGNIZE STATIC HANDWRITTEN AND MACHINE GENERATED TEXT

APPLICATIONS FOR CLAIM OF PRIORITY

This application claims the benefit under 35 U.S.C. §119 (e) of U.S. Provisional Application No. 60/758,078 filed Jan. 11, 2006. The disclosure of the above-identified application is incorporated herein by reference as if set forth in full.

CROSS REFERENCE TO RELATED APPLICATIONS

This application is related to U.S. patent application Ser. No. 10/791,375, entitled "SYSTEMS AND METHODS FOR SOURCE LANGUAGE WORD PATTERN MATCHING," filed Mar. 1, 2004, U.S. patent application Ser. No. 10/936,451, entitled "SYSTEM AND METHOD FOR BIOMETRIC IDENTIFICATION USING HANDWRITING RECOGNITION," filed Sep. 7, 2004, U.S. patent application Ser. No. 10/896,642, entitled "SYSTEMS AND METHODS FOR ASSESSING DISORDERS AFFECTING FINE MOTOR SKILLS USING HANDWRITING RECOGNITION," filed Jul. 21, 2004, U.S. Provisional Application No. 60/758,092, entitled "PICTOGRAPHIC RECOGNITION TECHNOLOGY APPLIED TO DISTINCTIVE CHARACTERISTICS OF ARABIC TEXT," filed Jan. 11, 2006, U.S. Provisional Application No. 60/758,009, entitled "TEST OF XP HANDWRITING CAPABILITY," filed Jan. 11, 2006, U.S. Provisional Application No. 60/758,019, entitled "PROGRAM MANAGED DESIGN," filed Jan. 11, 2006, and U.S. Provisional Application No. 60/758,008, entitled "CTG AUTOGROUPER CODING ENHANCEMENT TOOL," filed Jan. 11, 2006. The disclosure of the above identified applications are incorporated herein by reference as if set forth in full.

BACKGROUND

I. Field of the Invention

The embodiments disclosed in this application generally relate to dynamic recognition technologies used for recognizing static handwritten and machine printed text.

II. Background of the Invention

Dynamic Handwriting Recognition provides real time interpretation of handwritten strokes and is used primarily within Tablet personal computer (PC) or personal digital assistant (PDA) environments. In the Tablet PC application, the dynamic recognizer receives real-time handwriting data provided directly by the writer using a stylus. Based on the movements of the stylus, a digital representation of handwritten strokes can be captured as words are written. Basically, the stylus and pad interface is used to capture the strokes and convert them into ordered sequences of coordinates. These strokes are stored as data that is frequently referred to as "digital ink". Digital ink consists of geometric plots of the strokes, stroke sequence, pen pressure, pen angle, and the like. Of these features, the ones most important for recognition are the geometry of the strokes and the sequence in which they were written. The digital ink is passed to the Dynamic Handwriting Recognition software to identify the handwriting data (e.g., character, word segment, word, etc.). Because of the rich set of features that Dynamic Handwriting Recognition draws from, it has achieved very significant accuracy levels.

Unlike Dynamic Handwriting Recognition where user input is captured in real-time, Static Handwriting Recognition involves capturing data from images of scanned documents. The images store only handwriting or machine generated data in a static form. As such, Static Handwriting Recognition draws upon fewer possible features than Dynamic Handwriting Recognition and therefore has achieved lesser levels of accuracy.

For instance, many features (e.g., stroke direction, stroke sequence, pen pressure, etc.) used for Dynamic Recognition that are captured while the actual writing is taking place are not present in scanned static images of handwriting and machine generated text. Therefore, Dynamic Recognition technology is not directly applicable for Static Recognition tasks such as text (e.g., handwriting, machine generated text, etc.) conversion from scanned documents.

SUMMARY

Methods and apparatuses for converting static text into digital ink to enable Dynamic Recognition are disclosed.

In one aspect, a method for converting a character string into digital ink files is disclosed. The character string is extracted from a static document and converted into a representative character string graph. Common embedded isomorphic graphs from the representative character string graph are then extracted. An isomorphic database key is generated for each of the common embedded isomorphic graphs extracted. A shape key is then ascertained for each of the respective common embedded isomorphic graphs extracted using a data structure associated with each of the respective common embedded isomorphic graphs and a set of geometric measurements unique to each of the common embedded isomorphic graphs are created. A digital ink database key is then created for each of the common embedded isomorphic graphs utilizing the isomorphic database key and shape key associated with each of the common embedded isomorphic graphs. A stroke sequence for each of the common embedded isomorphic graphs is determined by comparing the digital ink database file associated with each of the common embedded isomorphic graphs against a digital ink file database. A digital ink file is built for each of the common embedded isomorphic graphs using the stroke sequence determined for each of the common embedded isomorphic graphs.

In a different aspect, another method for converting a character string into digital ink files is disclosed. The character string is extracted from a static document. The character string is converted into a representative character string graph. The common embedded isomorphic graphs are extracted from the representative character string graph. A stroke sequence for each of the common embedded isomorphic graphs extracted is determined using an algorithm. A digital ink file is created for each of the common embedded isomorphic graphs using the stroke sequence determined for each of the common embedded isomorphic graphs.

In another aspect, a method for recognizing a character string on a static document is disclosed. The character string is extracted from the static document. The character string is converted into a representative character string graph. The common embedded isomorphic graphs are extracted from the representative character string graph. Each of the common embedded isomorphic graphs extracted are converted into digital ink files. The character string associated with each of the digital ink files are identified using a dynamic recognition system.

These and other features, aspects, and embodiments of the invention are described below in the section entitled "Detailed Description."

BRIEF DESCRIPTION OF THE DRAWINGS

For a more complete understanding of the principles disclosed herein, and the advantages thereof, reference is now made to the following descriptions taken in conjunction with the accompanying drawings, in which.

DETAILED DESCRIPTION

Methods and apparatuses for converting static text into digital ink to enable Dynamic Recognition are disclosed. Although all references herein are made to "handwritten" language, the methods and apparatuses described are equally applicable to "machine generated" text (i.e. font-based text from a laser printer). The handwriting example is cited because it represents the harder recognition problem. It will be obvious, however, that the present invention may be practiced without some or all of these specific details. In other instances, well known process operations have not been described in detail in order not to unnecessarily obscure the present invention.

As used herein, a diacritical mark is a mark augmenting the main portion of a character. For example, the dot over a lower case "i" or a German umlaut. Recognition is a function that when given graphical input, returns a list of candidate strings. A skeleton is a portion of an image that remains when the outer contours have been removed so that only a line with a thickness of a single pixel remains. Alternatively, this line represents a graph that preserves the overall orientation and topography of an image.

The use of Graph Theory offers a basis for a data structure to enable Dynamic Recognition engines to recognize static text. For present purposes, the concept of using Dynamic Recognition technology to recognize objects in static images will be labeled Static-to-Dynamic Recognition. Graphs can be used in support of Static-to-Dynamic Recognition by creating mathematical representations from writing samples that couples topology and geometry of writing with other information not directly available from images, such as stroke sequence. Therefore, graphs provide a means to extract written line sequences from static text (e.g., handwriting, machine generated text, etc.) and attach data indicating the stroke sequence a writer would use to produce the lines. The combination of the graphs and stroke sequence provides sufficient data to generate the digital ink that enables the Dynamic Recognition process.

Figure 1:
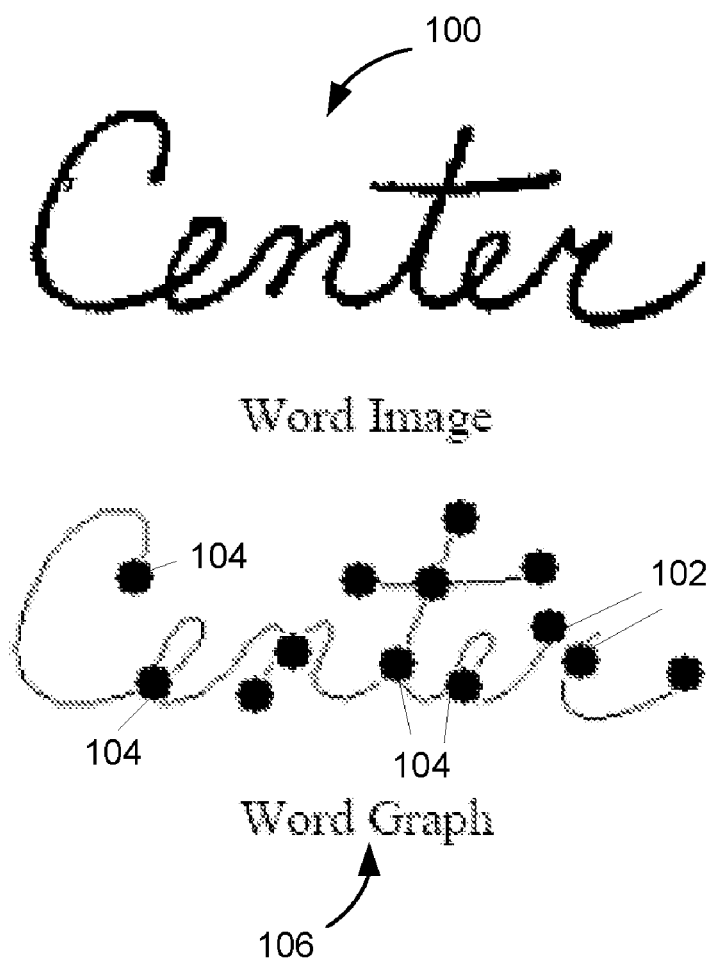
FIG. 1 is an illustration of the handwritten and graph forms of the word "Center", in accordance with one embodiment.

Graph Theory is a branch of mathematics that focuses on representing relationships as line diagrams containing nodal points and linkages among these points. As shown in FIG. 1, a graph 106 is comprised of multiple nodal points 102 and linkages 104. Nodal points 102 (also known as vertices) are points at which strokes cross and linkages 104 (also known as edges) are the actual strokes that comprise the word 100. That is, nodal points 102 are the endpoint or intersection of multiple edges. Linkages 104 (i.e., strokes, edges, etc.) are the path or set of contiguous pixels between two vertices. In a personal computing (PC) or personal digital assistant (PDA) environment, linkages 104 are entered using a stylus and pad input device between "stylus-down" and "stylus-up" events.

In all written language, graphs offer direct means of capturing the essence of the written form. The graph 106 coverts all the information extracted from the word 100 into a concise mathematical format that is highly computable. In one embodiment, the word 100 is an Arabic word. In another embodiment, the word 100 is an English word. It should be appreciated that the word 100 may be in any language as long as the words 100 written in the language may be processed Graph Theory into a graphic form that captures nodal point 102, linkage 104 and feature vector information unique to the word 100. The extensibility of the methods herein described to all written language results from the common origin of writing systems as shapes inscribed as line forms.

Within the graph 106, the connectivity among the nodal points 102 and linkages 104 comprises the overall topology (i.e., structure) of the graph 106. Also captured within the graph 106 is the graph geometry, which is expressed in terms of distances, angles and other characteristics of the graph components. The graph geometry can be expressed as a series of feature vectors (all features) or the graph's Alphabetic Kernel or Shape Descriptors (selected features). The feature vector is a multi-dimensional expression of the multitude of measurements that are extracted from the graph 106 and the Alphabetic Kernel or Shape Descriptors represents the subset of these features that distinguishes among isomorphic graphs representing different classes such as the letters of the alphabet. In one embodiment, the graph 106 in FIG. 1 depicts an entire word. In another embodiment, the graph 106 in FIG. 1 depicts a word segment (a grouping of continuous characters within a word). In still another embodiment, the word graph 106 in FIG. 1 depicts just a single character.

Figure 2:
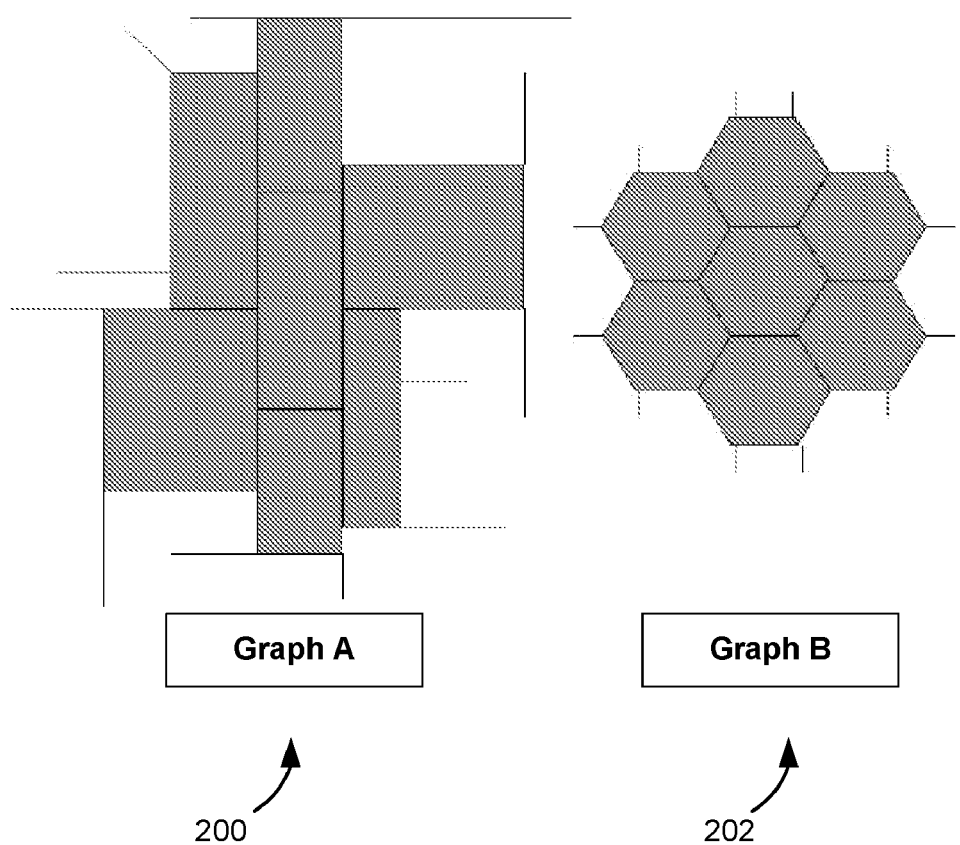
FIG. 2 is an illustration of two isomorphic graphs with different features, in accordance with one embodiment.

Two or more graphs are considered isomorphic when they have the same graph topologies. For example, as depicted in FIG. 2, Graph A 200 appears to have substantially different features than Graph B 202. However, Graph A 200 and Graph B 202 are considered isomorphic as they share an identical topology. That is, they (i.e., Graph A 200 and Graph B 202) have the same number of nodal points and strokes connected in exactly the same way. Graph A 200 and Graph B 202 appear to be different only because their respective geometries are different, that is, the topologies of Graph A 200 and Graph B 202 are identical whereas the angles and distances between their respective features (i.e., nodal points and linkages) are different. In one embodiment, the graph topologies are algorithmically converted to a representative numeric code (i.e., isomorphic database key). The unique code will always be associated with a particular unique topology and all topologies isomorphic to it. In another embodiment, the topologies, considered in concert with their attendant physical measurements, are converted into a representative word, character string or individual character. It should be understood, however, that the graph topologies may be converted into any type of data string as long as the string reproducibly conveys the topology and geometry of the character, word segment or word in a format that can be readily computed.

Figure 3A:
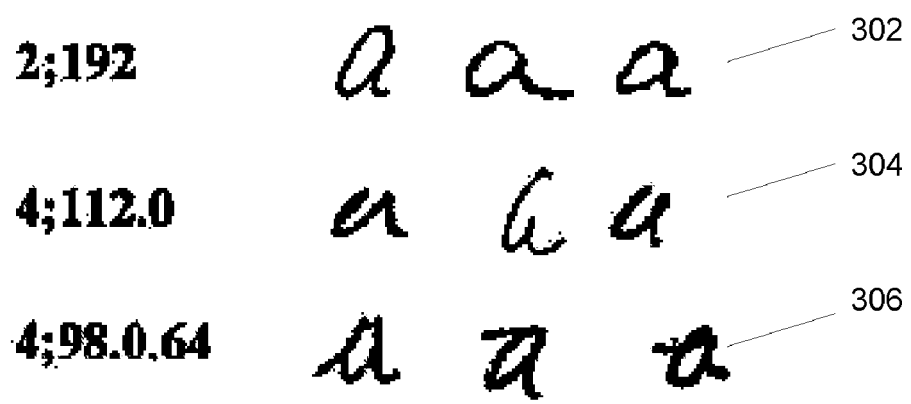
FIG. 3A is an illustration of sample character "a" for three different graph isomorphic classes, in accordance with one embodiment.
Figure 3B:
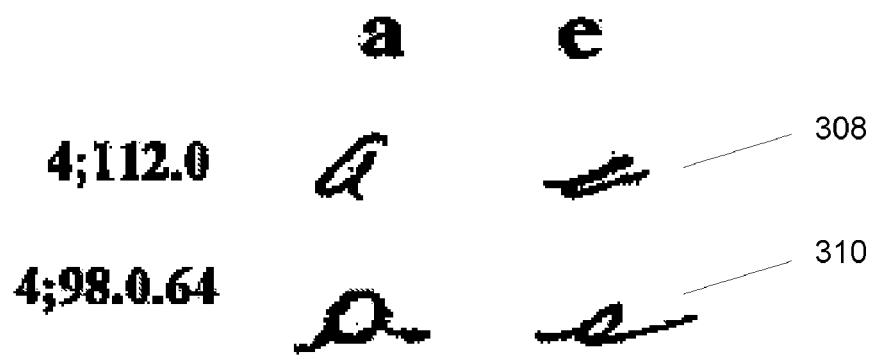
FIG. 3B is an illustration of sample characters "a" and "e" sharing the same isomorphic graph, in accordance with one embodiment.

Identical characters, word segments, or words may result in graphs that have different topologies due to variations in the handwriting representations of the character or word segment. This is shown in FIG. 3A, where three different graph isomorphic classes are depicted for handwritten representations of the character "a". That is, the classes labeled "2;192" 302, "4;112.0" 304, and "4;98.0.64" 306 all depict handwritten representations of the character "a", each class having a different topology. These "class numbers" are the numeric representation of the graph topologies generated by the current embodiment. Despite having different topologies, all three classes are handwritten depictions of the same character "a". Moreover, different characters, word segments, and/or words may result in graphs that have identical topologies. Again, this is due to variations in the handwriting representations of the character, word segment, and/or word. This is shown in FIG. 3B, where representations of two separate topographic classes (i.e., "4;112.0" 308 and "4;98.0.64" 310) show that characters "a" and "e" may share the same identical topographic class.

Figure 4A:
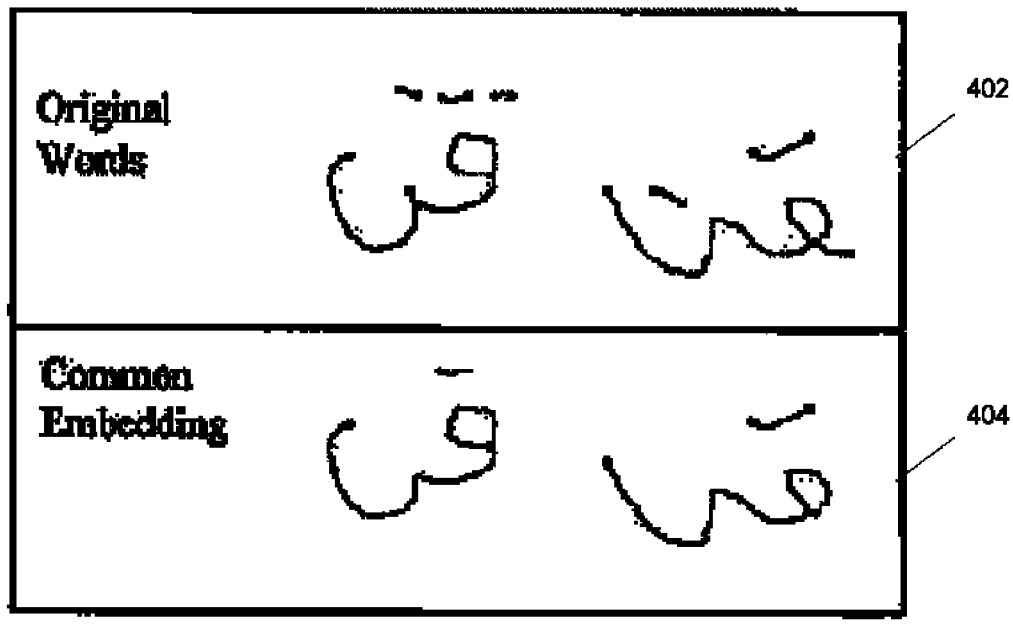
FIG. 4A is an illustration comparing an original handwritten form of an Arabic word segment to the common embedded forms of the word segment, in accordance with one embodiment.
Figure 4B:
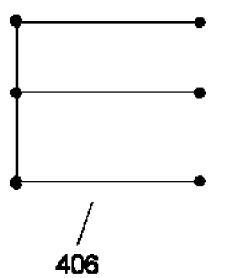
FIG. 4B is an illustration of two representations of the character "E" where one representation is the common embedded form of the other, in accordance with one embodiment.
Figure 4B:
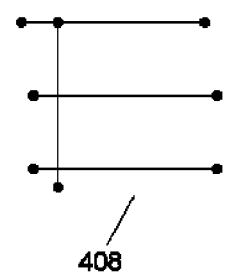

Handwritten representations of the same characters, word segments (i.e., character sequences) and words are usually quite similar graphically and distinguished only by a few differences such as extra or omitted strokes. Because of these differences, the graphs that they produce will be different within the strict definition of graph isomorphism. However, as depicted in FIG. 4A, there will often exist an embedded graph that transcends multiple handwriting samples and is isomorphic across samples. This embedded graph is referred to herein as the common embedded form. In FIG. 4A, the common embedded forms 404 of two handwritten representations of a first Arabic word segment 402 is depicted. As can be seen in FIG. 4A, the two handwritten forms of the first Arabic word segment 402 have several differences principally related to additional strokes along the top and bottom of the word segment 402. However, they do share significant common embedding as shown by the common embedded graphs 404 in the lower portion of the figure. FIG. 4B shows two examples of the character "E" where the left form 406 is completely embedded in the right form 408. It should be understood that the concept of common embedded forms is not unique to Arabic, or English. This concept applies to all written languages including those with "Latin-based" characters, such as English, Semetic languages and particularly applies to "pictoform-based" languages such as Kanji and Chinese. It should be appreciated that the graph that encompasses the entire character string (the character string graph) can also be treated as a common embedded graph.

Figure 5A:
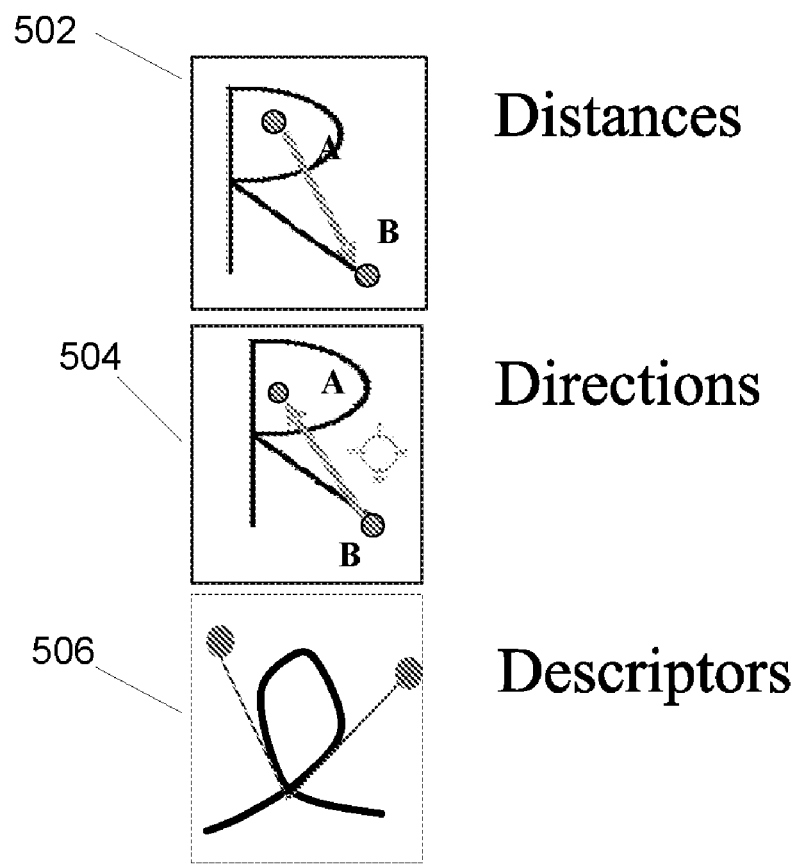
FIG. 5A is an illustration of the various types of geometric measurements that can be obtained from a character, word segment, or word graph, in accordance with one embodiment.

FIG. 5A is an illustration of the various types of geometric measurements that can be obtained from a character, word segment, or word graph, in accordance with one embodiment. As depicted herein, geometric measurements may include distance 502 and directional measurements 504 among the various graph features and descriptor measurements 506 (i.e., exit direction, the skew, the edge aspect ratio, the edge length, the bending energy, the Bezier offsets, etc.). It should be understood that any type or form of graph features may be measured as long as the features may be reproducibly located on the graph and measured using a conventional computing device.

Figure 5B:
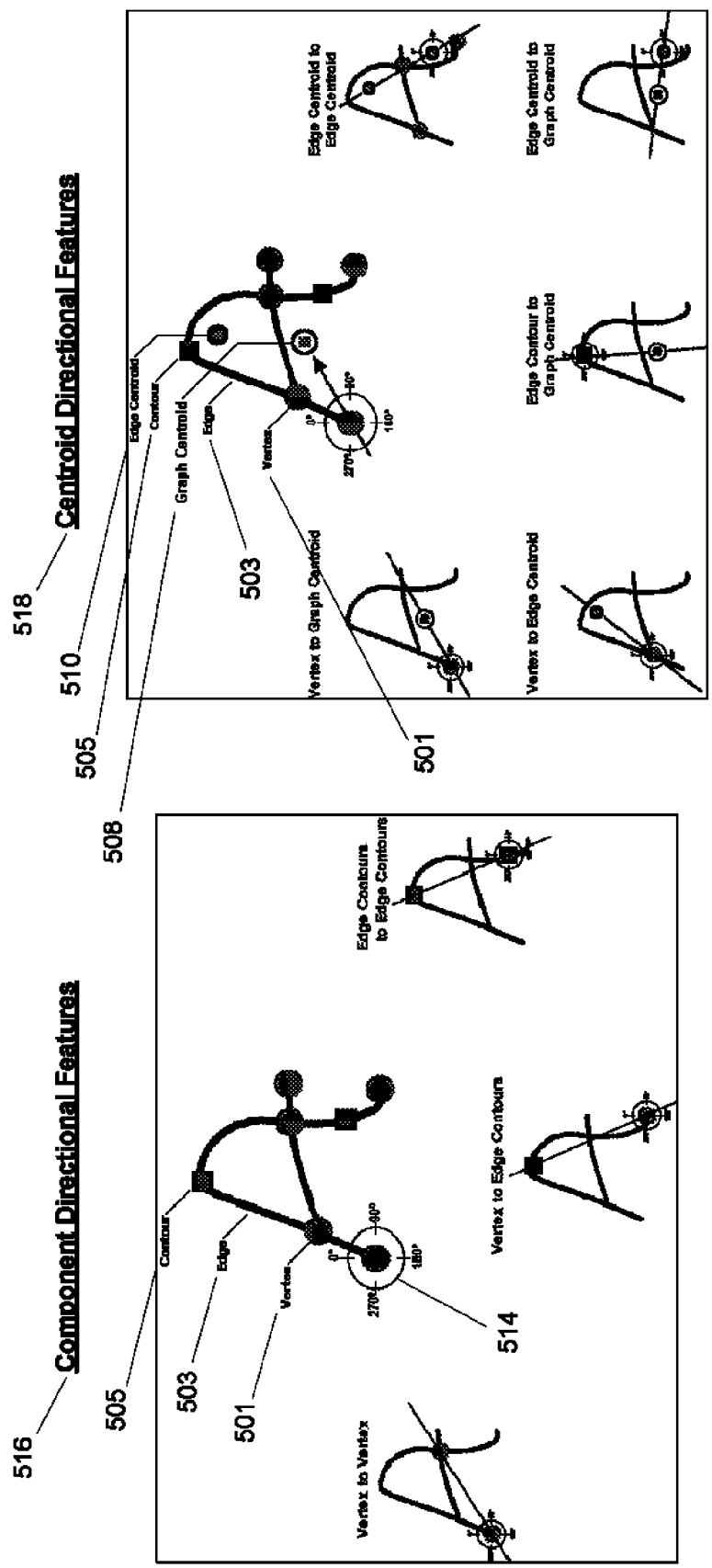
FIG. 5B depicts how the directions among the various graph features can be measured, in accordance with one embodiment.

For instance, FIG. 5B depicts how the directions 504 among the various graph features can be measured, in accordance with one embodiment. The direction 504 being quantified as the angles 514 between the various graph components. The angle 514 may be measured in two separate classes of graph components: the component directional features 516 and the centroid directional features 518.

Examples of component directional features 516 include the graph nodal 501 points (i.e., vertices), linkages 503 (i.e., edges), and edge contours 505. In one embodiment, the angle 514 is measured from one nodal point 501 to another nodal point 501. In another embodiment, the angle measured from one edge contour 505 to another edge contour 505. In still another embodiment, the angle measured is from one edge contour 505 to a nodal point 501 or vice versa. It should be appreciated, that the angles 514 between any type of component directional features 516 can be measured as long as the features can be reproducibly located on the graph.

Examples of centroid directional features 518 include the graph centroid 508 and the edge centroid 510. In one embodiment, the angle 514 is measured between some pairing of a nodal point 501 with either a graph centroid 508 or an edge centroid 510. In another embodiment, the angle 514 is measured between one graph centroid 508 and another graph centroid 508. In still another embodiment, the angle 514 is measured between one edge centroid 510 and another edge centroid 510. It should be understood, that the angles 514 between any type of centroid directional features 518 can be measured as long as the features can be reproducibly located on the graph.

Figure 6A:
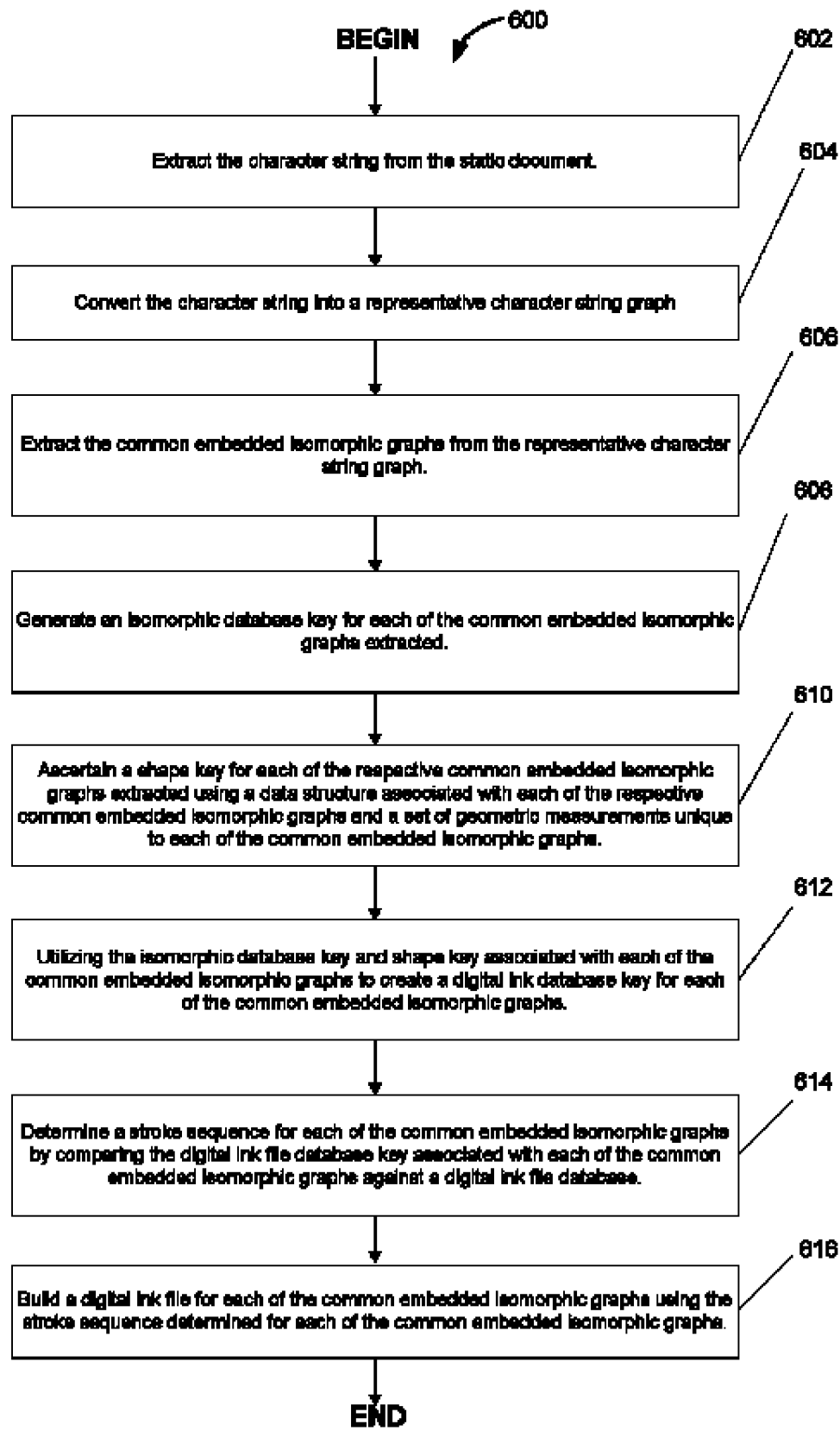
FIG. 6A is a flowchart of a method for converting a character string into digital ink files using a digital ink file database, in accordance with one embodiment.

FIG. 6A is a flowchart of a method for converting a character string into digital ink files using a digital ink file database, in accordance with one embodiment. As discussed earlier, in order to enable a Dynamic Recognition engine to perform Static-to-Dynamic Recognition on static text, the text must be first converted into digital ink files. One method for converting character strings (i.e., text) into digital ink is through the use of a digital ink file database that is configured to identify a digital ink file for each of the common embedded isomorphic graphs of the character string using a unique digital ink database key associated with each of the common embedded graphs. Method 600 begins with operation 602 where a handwritten character string is extracted from a handwritten word. The character string may be comprised of any single character or continuous combination of characters within a word found in the representative set of words including the entire word itself or a group of words. In one embodiment, the handwritten character string is written in Arabic language script. In another embodiment, the handwritten character string is written in English language script. It should be appreciated that the handwritten character string may be written in any language as long as the character string may be processed by a conventional computing device into a graphic form that captures nodal point, linkage and vector feature information unique to the character string.

The extraction of the character string in operation 602 is automatic. Automatic extraction entails the use of a computer program that processes the image using prescribed logic (e.g., handwriting convention, user defined rules, etc.) to detect forms that should be extracted.

The method 600 continues on to operation 604 where the character string is converted into a representative character string graph. Essentially, a character string graph coverts all the information extracted from the character string into a concise mathematical format that is highly computable. In one embodiment, a character string graph is comprised of the multiple nodal points and linkages within the character string. In another embodiment, the character string graph is comprised of either the nodal points or the linkages within the character string. It should be understood, however, that the character string graph may be comprised of any graphical information regarding the visible features of the character string as long as the information representing the unique aspects of the character string is reproducible.

Method 600 moves on to operation 606 where all the common embedded isomorphic forms of the representative character string graph are extracted. The common embedded isomorphic forms are those embedded graphs that capture the essential defining characteristics of the character string being processed. In one embodiment, during the identification of the common embedded isomorphic forms, a threshold setting may be used. For example, the threshold may be set to extract only those embedded graphs that occupy more than 75 percent of the graph's structure of the original character string from which they were extracted. It should be appreciated, however, that this threshold setting is presented by way of example only in practice the threshold setting may be set to any value so long as the resulting common embedded graphs extracted retain the essential defining characteristics of the original character string graph.

In one embodiment, the common embedded isomorphic graphs of a character string are extracted using an "isomorphic database". That is, a database where all the common embedded isomorphic forms of a graph having a particular topology may be stored. For example, during a lookup on the isomorphic database, a character string is first converted into a graph to generate an isomorphic key based on the nodal points and linkages in the graph. The isomorphic key is then matched to the isomorphic database to extract all the common embedded isomorphic graphs for the particular character string that does not fall below a threshold value. In another embodiment, an algorithm is applied to the character string to arrive at all the common embedded isomorphic forms. This is accomplished by the algorithm "toggling on" and "toggling off" certain features (e.g., edges, nodal points, etc.) of the character string graph in accordance with a threshold setting. This technique will produce $2^n$ embedded graphs where "n" is the total number of graph features (nodes or strokes) in the graph. A threshold can be implemented using the physical dimensions of each edge and establishing a ratio of the aggregate lengths represented by the total number of edges toggled "off" or "zero" to the aggregate length of all edges in the entire graph. Thus, a threshold of 75 percent would include all embedded graphs that comprised "at least" 75 percent of the aggregate edge length entire graph.

Static-to-Dynamic recognition requires that stroke sequence information be added to the graphs extracted from the character string graph. This information can be added either through a database of stroke information or through an algorithm that assigns stroke sequence. The database approach is described as follows.

The method 600 continues on to operation 608 where an isomorphic database key is generated for each of the common embedded isomorphic graphs extracted. As discussed above, the isomorphic database key is generated based on the nodal points and linkages in the graph. The method 600 proceeds on to operation 610 where a shape key is ascertained for each of the common embedded isomorphic graphs extracted using a data structure associated with each of the respective common embedded isomorphic graphs and a set of geometric measurements unique to each of the common embedded isomorphic graphs. The shape key is a simple character string that conveys descriptive information regarding the overall geometric shape of the common embedded isomorphic graph that the key is ascertained from. The purpose of the shape key is to "classify" graphical forms by their general shape. For instance, the characters "p" and "b" have the same topology and would generate graphs that are isomorphic. However, the concept of the shape key will distinguish these two characters because their shapes are fundamentally different. The letter "p" has a descending stroke and the letter "b" has an ascending stroke.

Figure 7:
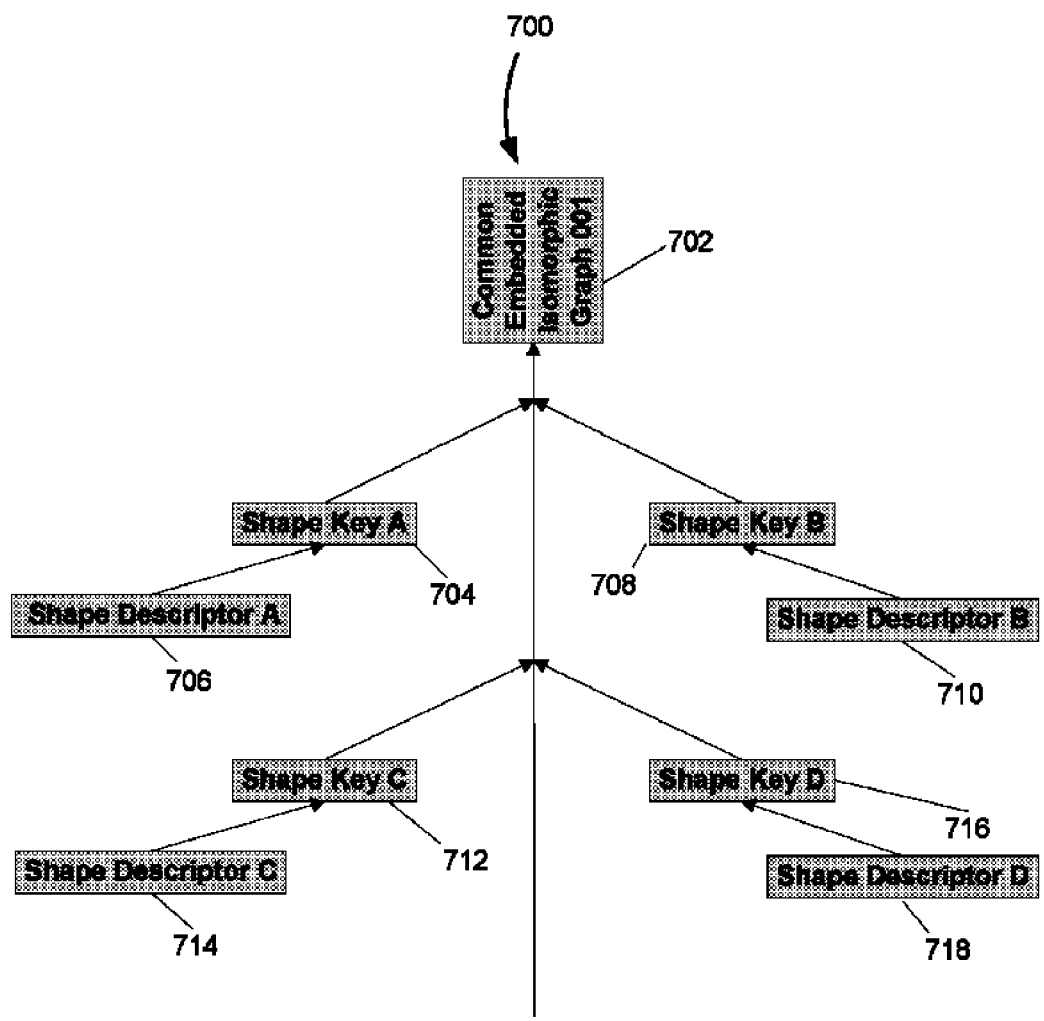
FIG. 7 is an illustration of a data structure created using a Regression Tree Classifier method, in accordance with one embodiment.

An example of the data structure is illustrated in FIG. 7, which depicts a tree diagram 700 of various different shape keys (e.g., Shape Key A 704, Shape Key B 708, Shape Key C 712, and Shape Key D 716) each sharing the same underlying graph topology (i.e., common embedded isomorphic graph "001" 702) and associated with a grouping of shape feature descriptors (i.e., Shape Descriptor A 706, Shape Descriptor B 710, Shape Descriptor C 714, and Shape Descriptor D 718) unique to each particular shape key.

As used herein FIG. 7, the feature vectors are the multitude of geometric measurements that are extracted from the common embedded isomorphic graph that distinguishes one shape key from another shape key sharing the same overall isomorphic structure. Shape Descriptors are multi-dimensional expressions of the actual physical features (i.e., a subset of feature vectors) used to differentiate different shapes sharing the same overall isomorphic structure. The use of Shape Descriptors is advantageous for the sake of efficiency and the fact that even a relatively simple graph such as a "T" shape can be measured in hundreds of different ways resulting in hundreds of different feature vectors. In one embodiment, the Shape Descriptor includes only feature vector information regarding the directional orientation of the various features in a graph as described in FIG. 5B. It should be appreciated that any class of feature vector information (e.g., distance, descriptors, etc.) may be used as long as the information can be utilized to differentiate shape keys sharing the same underlying isomorphic structure.

Shape Descriptors can be "teased" from the full salient set of feature vectors used to differentiate different shapes (i.e., shape keys) sharing the same isomorphic structure using a variety of techniques that ultimately result in a data structure. Irrespective of the technique used to construct the data structure, the resulting data structure should be capable of teasing out the different shape keys based on the Shape Descriptors. In one embodiment, the data structure encompassing various different shape keys sharing the same isomorphic structure is derived using a Regression Tree Classifier method. For example, the "data tree" type of data structure shown in FIG. 7 results from the Regression Tree Classifier method. Specifically, the Regression Tree Classification builds a decision tree where each "split" is based on certain distinctive physical measurements (i.e., Shape Descriptors) uniquely associated with each "shape key" sharing the same isomorphic structure as the common embedded isomorphic graph being classified (i.e., Common Embedded Isomorphic Graph "001" 702). Therefore, each branch of the data tree structure leads to a "Terminal Node" that is comprised of a Shape Key associated with a unique Shape Descriptor (e.g., Shape Key A 704 and Shape Descriptor A 706, etc.). When an actual classification of a common embedded isomorphic graph is performed to identify a shape key, decisions are made and a path followed until a Terminal Node is reached.

For example, Shape Key A 704 is associated with Shape Descriptor A 706, which distinguishes Shape Key A 704 from all other shape keys (i.e., Shape Key B 705, Shape Key C 712, and Shape Key D 716) that share the same isomorphic structure as Common Embedded Isomorphic Graph "001" 702. To identify the shape key for Common Embedded Isomorphic Graph "001" 702, the Shape Descriptor of the "001" graph 702 is first ascertained and then compared against the Shape Descriptors (i.e., Shape Descriptor A 706, Shape Descriptor B 710, Shape Descriptor C 714, and Shape Descriptor D 718) that describes a known shape key (i.e., Shape Key A 704, Shape Key B 705, Shape Key C 712, and Shape Key D 716) sharing the same graph structure as Graph "001" 702. This identification operation is performed for each of the common embedded isomorphic graphs identified from the representative character string graph in operation 608.

In another embodiment, the data structure is derived using a method based on a discriminant analysis method. In still another embodiment, a neural network method is used. In all cases, the methods used to derive the data structure are configured to glean from the entire universe of features (the complete listing of feature vectors) a subset of salient features (i.e., the Shape Descriptors) that effectively distinguish one shape key from another. This data structure, derived during modeling, provides the basis for differentiating between various classes (i.e., Shape Keys) sharing the same isomorphic structure by focusing on those features (i.e., Shape Descriptors) exhibiting the greatest power of discrimination among different classes. It should be appreciated, however, that the data structure can be derived and used for classification employing any predictive methodology as long as the resulting structure can be adequately processed by a conventional computing device during the matching of Shape Descriptor information against the various different shape key identities saved in the structure.

Method 600 moves on to operation 612 where a digital ink database key is created utilizing the isomorphic database key and the shape key associated with each of the common embedded isomorphic graphs to create a digital ink database key. The digital ink key is designed to compartmentalize the information stored in the isomorphic database key and shape key. A unique digital ink database key is generated using this operation for each of the common embedded isomorphic graphs extracted from the character string.

Method 600 goes on to operation 614 where a stroke sequence is determined for each of the common embedded isomorphic graphs by comparing the digital ink file database key associated with each of the common embedded isomorphic graphs against a digital ink database. A byproduct of the isomorphic database key generation process is that an "order" is established for the representative character string graph from which the key was generated. The order takes the form of a sequential numeric value assigned to each edge and vertex in the graph. Since isomorphic graphs have the same number of edges and vertices, these graphs will have the same number of components that can be ordered. Graphs that have the same isomorphic key and produce the same Shape Descriptor will possess the same order. This concept of order is the basis for assigning a stroke sequence using the digital ink database.

The digital ink database is configured to associate unique stroke sequences with each digital ink file database key and provide a manner for those unique stroke sequences to be looked up when a digital ink file database key is compared against the database. The stroke sequence information is stored as an ordered pathway for creating the common embedded isomorphic graph associated with the digital ink file key. In one embodiment, this order is described in terms of edges only. In another embodiment, this order is described in terms of vertices only. In still another embodiment, this order is described in terms of both edges and vertices. In the case of loops, the stroke sequence must provide the direction by which the loop should be traversed.

Figure 6B:
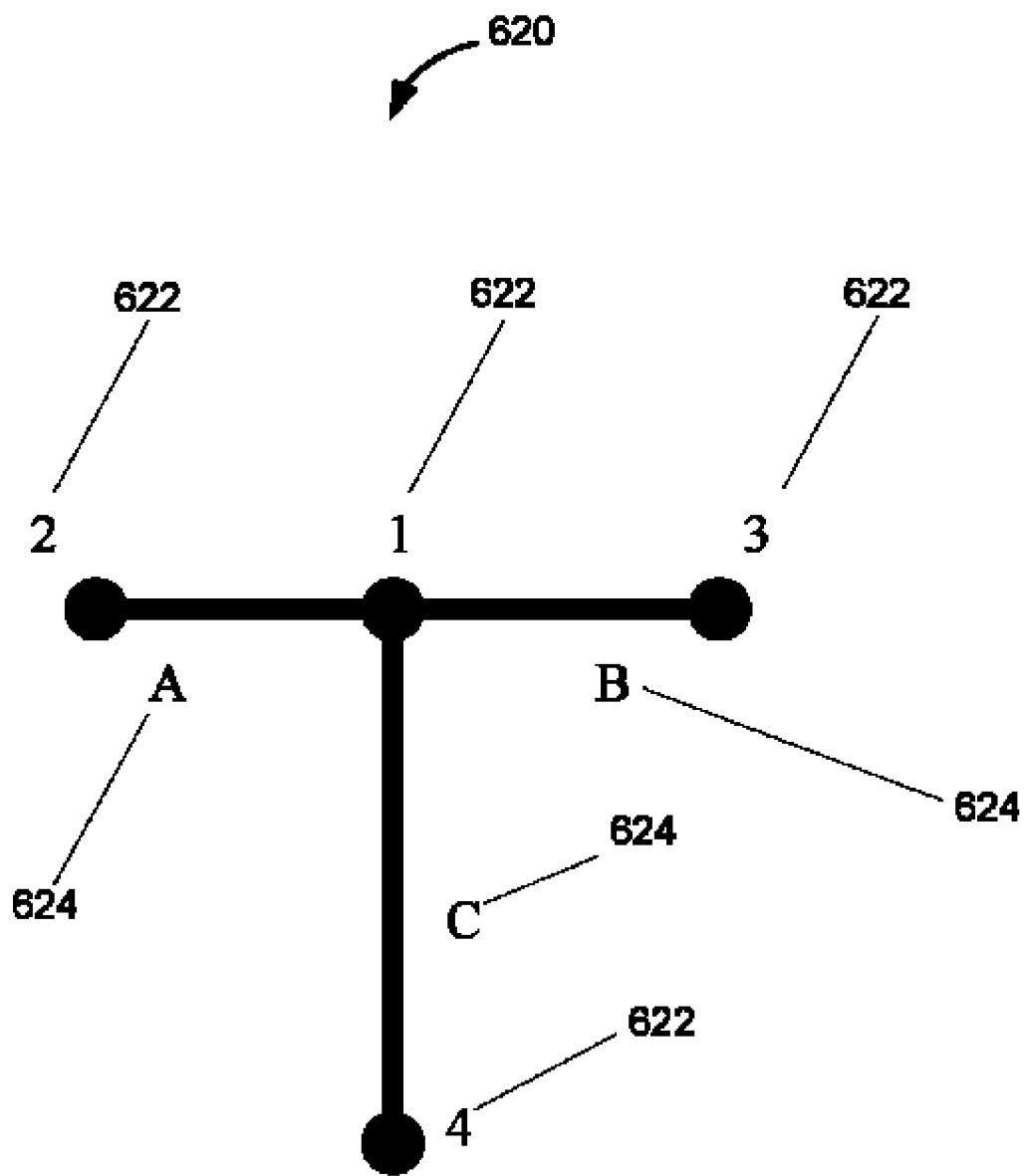
FIG. 6B is an illustration that shows an ordered graph structure 620 for the upper case letter "T," in accordance with one embodiment.

Records within the digital ink database are accessed through a composite key (i.e., digital ink file database key) built from the Isomorphic Database key and the Shape Descriptor. Each record within the database contains a set of instructions for a pathway through the graphical form. These instructions are articulated in terms of a series of vertices and edges. The vertices describe where a sequence starts and the edges describe the actual path to be followed. For example, FIG. 6B shows an ordered graph structure 620 for the upper case letter "T". Each vertex 622 is labeled with a number and each edge 624 labeled with a letter. Vertex "1" is considered the "prime vertex" from the isomorphic key generation process since it has the highest level of connectivity to other vertices Stroke order is specified as "node to node" (i.e., vertex 622 to vertex 622) movement via a particular edge 624. The stroke order for this figure would be described as follows: Node 2 to Node 1 via Edge A. Then, Node 1 to Node 3 via Edge B. Then Node 1 to Node 4 via Edge C. All that is necessary to use this information to generate digital ink is to use the edge 624 and vertex 622 labels for each extracted graph as a coordinate system and record the actual physical coordinates encountered as this path is followed. These coordinates are the foundation for digital ink construction.

Method 600 proceeds on to operation 616 where a digital ink file is built for each of the common embedded isomorphic graphs using the stroke sequence determined for each of the common embedded isomorphic graphs. As discussed previously, a digital ink file captures the sequence of strokes used to create a common embedded isomorphic graph as well as the underlying topology of those graph. The digital ink file is rendered in a format that allows a conventional Dynamic Recognition engine to interpret the stroke sequence and graph topology information to provide recognition of the common embedded isomorphic graph associated with the digital ink file.

Figure 6C:
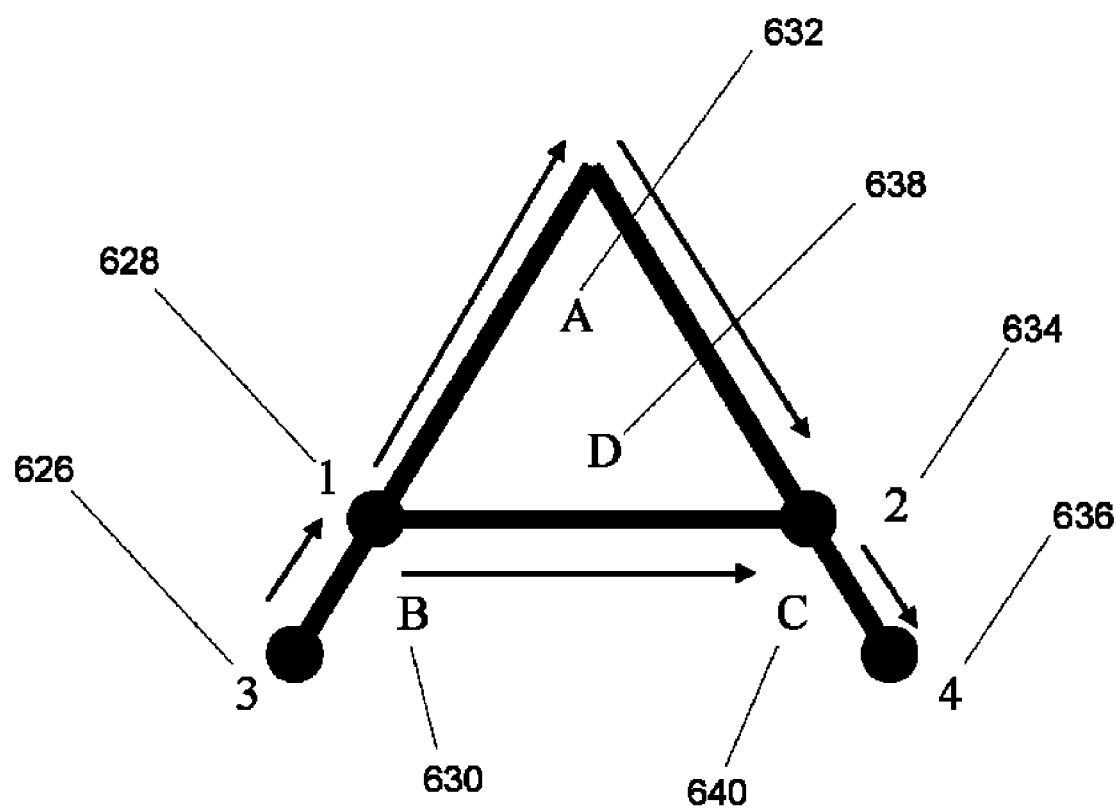
FIG. 6C is an illustration that shows the stroke path through the letter "A," in accordance with one embodiment.

Typically, the digital ink file contains a series of "point plots" describing the path that a hypothetical stylus takes across a hypothetical digital stylus pad. The path is described as the actual x and y coordinates that the stylus travels across the pad. A grouping of the coordinates (or pixels) comprises a stroke. Within the digital ink file, stroke groupings of sequential plots are ordered to reflect the sequence in which the writing occurs. For instance, an English writer of an uppercase "A" would start in the lower left-hand corner, raise the stylus and then write the horizontal crossing stroke from left to right. The stylus's entire path through this writing can be captured as a stroke sequence in the digital ink file. FIG. 6C shows the likely stroke path through the letter "A". This sequence would take the following path: Node 3 626 to Node 1 628 via Edge B 630, Node 1 628 to Node 2 634 via Edge A

632, Node 2 634 to Node 4 636 via Edge C 640 and Node 1 628 to Node 2 634 via Edge D 638.

Figure 8:
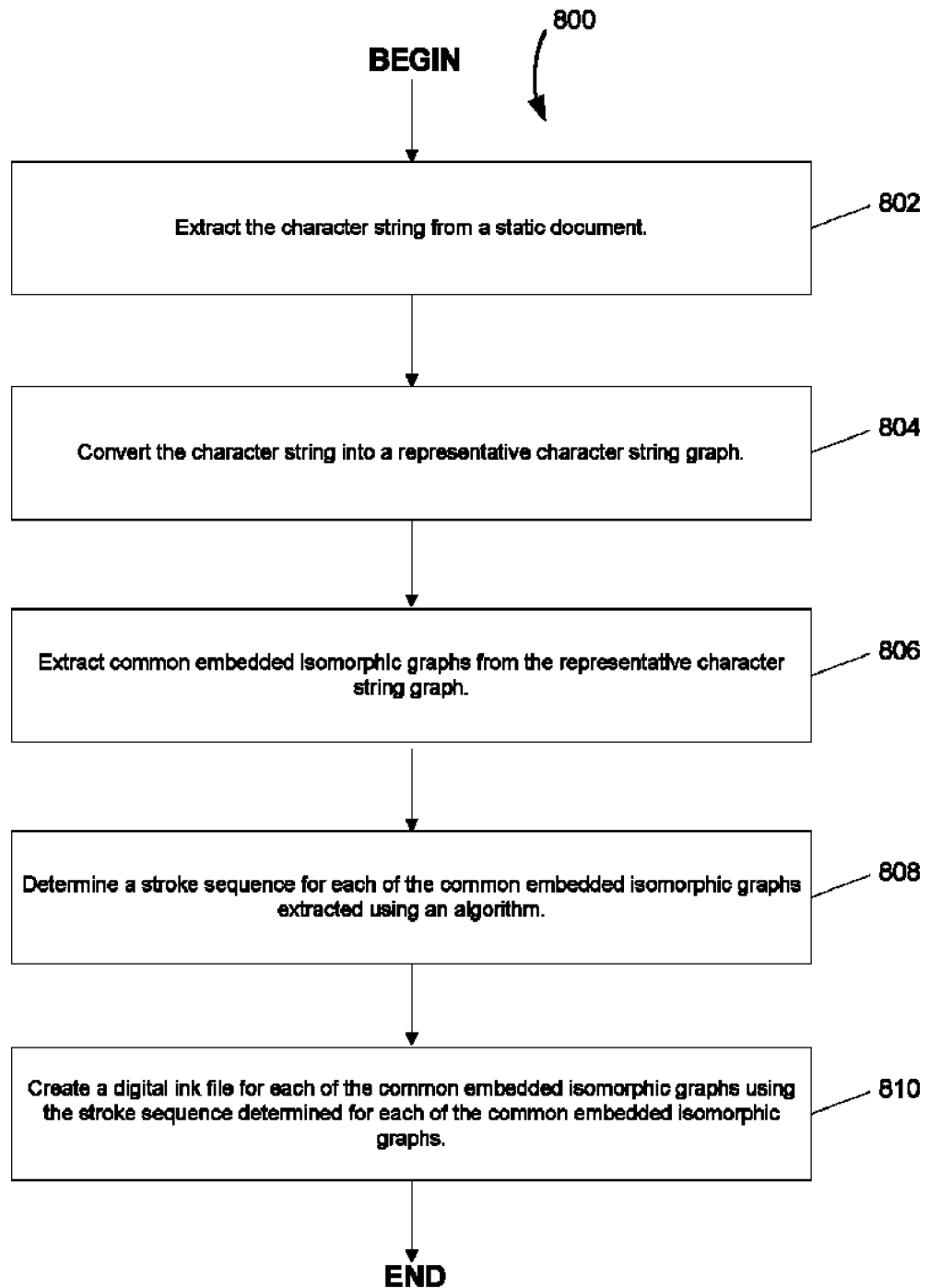
FIG. 8 is a flowchart of a method for converting a character string into digital ink files using an algorithm, in accordance with one embodiment.

FIG. 8 is a flowchart of a method for converting a character string into digital ink files using an algorithm, in accordance with one embodiment. Method 800 begins with operation 802 where a handwritten character string is extracted from a handwritten word on a static document. The character string may be comprised of any single character or continuous combination of characters within a word found in the representative set of words including the entire word itself. In one embodiment, the handwritten character string is written in Arabic language script. In another embodiment, the handwritten character string is written in English language script. It should be appreciated that the handwritten character string may be written in any language as long as the character string may be processed by a conventional computing device into a graphic form that captures nodal point, linkage and vector feature information unique to the character string.

The extraction of the character string in operation 802 is automatic using a technique by which a computer program processes the image using prescribed logic (e.g., handwriting convention, user defined rules, etc.) to detect forms that should be extracted.

The method 800 continues on to operation 804 where the character string is converted into a representative character string graph. Essentially, a character string graph coverts all the information extracted from the character string into a concise mathematical format that is highly computable. In one embodiment, a character string graph is comprised of the multiple nodal points and linkages within the character string. In another embodiment, the character string graph is comprised of either the nodal points or the linkages within the character string. It should be understood, however, that the character string graph may be comprised of any graphical information regarding the visible features of the character string as long as the information representing the unique aspects of the character string is reproducible.

Method 800 moves on to operation 806 where all the common embedded isomorphic forms of the representative character string graph are extracted. The common embedded isomorphic forms are those embedded graphs that capture the essential defining characteristics of the character string being processed. In one embodiment, during the identification of the common embedded isomorphic forms, a threshold setting may be used. For example, the threshold may be set to extract only those embedded graphs that occupy more than 75 percent of the graph's structure of the original character string from which they were extracted. It should be appreciated, however, that this threshold setting is presented by way of example only in practice the threshold setting may be set to any value so long as the resulting common embedded graphs extracted retain the essential defining characteristics of the original character string graph. The full character string graph can be considered to be a common embedded graph taken at the 100 percent embedding threshold.

In one embodiment, the common embedded isomorphic graphs of a character string are extracted using an "isomorphic database". That is, a database where all the common embedded isomorphic forms of a graph having a particular topology may be stored. For example, during a lookup on the isomorphic database, a character string is first converted into a graph to generate an isomorphic key based on the nodal points and linkages in the graph. The isomorphic key is then matched to the isomorphic database to extract all the common embedded isomorphic graphs for the particular character string that does not fall below a threshold value. In another embodiment, an algorithm is applied to the character string to arrive at all the common embedded isomorphic forms. This is accomplished by the algorithm "toggling on" and "toggling off" certain features (e.g., edges, nodal points, etc.) of the character string graph in accordance with a threshold setting. This technique will produce $2^n$ embedded graphs where "n" is the total number of graph features (nodes or strokes) in the graph. A threshold can be implemented using the physical dimensions of each edge and establishing a ratio of the aggregate lengths represented by the total number of edges toggled "off" or "zero" to the aggregate length of all edges in the entire graph. Thus, a threshold of 75 percent would include all embedded graphs that comprised "at least" 75 percent of the aggregate edge length entire graph.

Method 800 proceeds on to operation 808 where a stroke sequence is determined for each of the common embedded isomorphic graphs using an algorithm. In one embodiment, the algorithm is based upon the heuristics of the language that the character string is written in. For example, Table A shows a sample set of Arabic language heuristics that may be used to determine a stroke sequence that is combined with the isomorphic key for the each of the common embedded isomorphic graphs extracted to derive a digital ink file for each of the common embedded isomorphic graphs. It should be understood that the Arabic language heuristics shown in Table A are provided herein by way of example only and are not meant to limit the variety of Arabic language heuristics available for use in the algorithm.

Table A

Each contiguous subgraph of the skeletonized image is rendered as a single stroke.

Words and word parts are ordered from right to left.

Within a word or word part, the main stroke is written before any of its diacritical marks.

Strokes are written first from top to bottom, then from right to left.

Upper diacritical marks are written before lower diacritical marks.

Initial loops are written in a clockwise order. The direction of subsequent loops is chosen to minimize the change in direction from the incoming trajectory of the stroke.

Backtracking within a stroke is minimized.

By running each of the common embedded isomorphic graphs through the language heuristics based algorithm described in Table A, a stroke sequence can be determined for each of the common embedded isomorphic graphs as if the graphs were actually being inputted using a stylus and stylus pad. In another embodiment, the algorithm is based on some user defined rules that is independent of the language heuristics of the character string that the common embedded isomorphic graphs were extracted from. In still another embodiment, the algorithm is based on a combination of the language heuristics of the character string that the common embedded isomorphic graphs were extracted from and some user defined rules.

Method 800 goes on to operation 810 where a digital ink file is created for each of the common embedded graphs using the stroke sequence determined for each of the common embedded graphs. In one embodiment, the digital ink file is created in a file format that can be utilized by any of the conventional Dynamic Recognition engines available. In another embodiment, the digital ink file is created in a file format that is specific for a pre-determined type or vendor of Dynamic Recognition engine.

Figure 9:
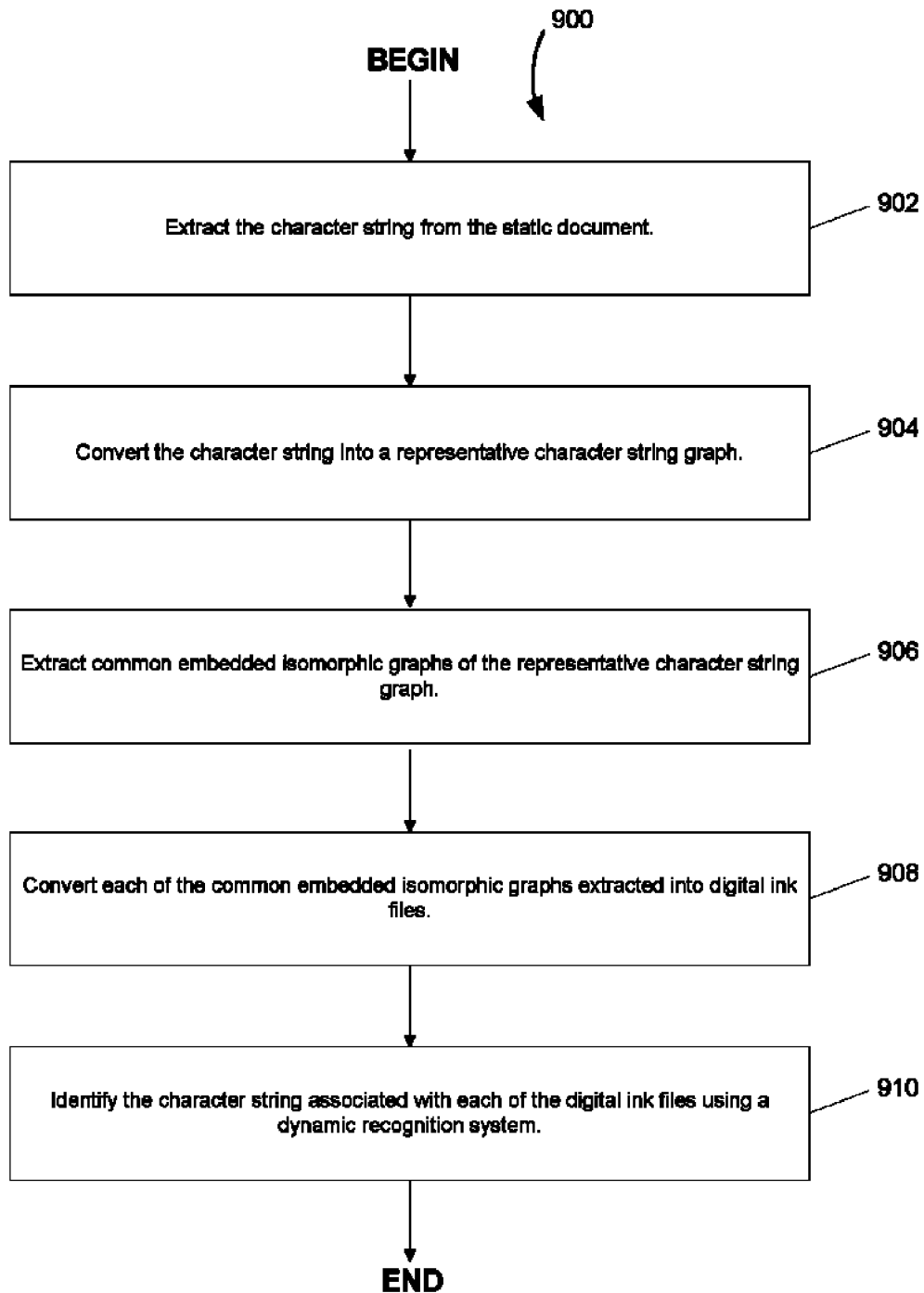
FIG. 9 is a flowchart of a method for recognizing a character string, in accordance with one embodiment.

FIG. 9 is a flowchart of a method for recognizing a character string, in accordance with one embodiment. Method 900 begins with operation 902 where a character string is extracted from a handwritten word. The character string may be comprised of any single character or continuous combination of characters within a word found in the representative set of words including the entire word itself. In one embodiment, the handwritten character string is written in Arabic language script. In another embodiment, the handwritten character string is written in English language script. It should be appreciated that the handwritten character string may be written in any language as long as the character string may be processed by a conventional computing device into a graphic form that captures nodal point, linkage and vector feature information unique to the character string.

The extraction of the character string in operation 902 is automatic. Automatic extraction entails a computer program that processes the image using prescribed logic (e.g., handwriting convention, user defined rules, etc.) to detect forms that should be extracted.

Method 900 continues on to operation 904 where the character string is converted into a representative character string graph. In one embodiment, a character string graph is comprised of the multiple nodal points and linkages within the character string. In another embodiment, the character string graph is comprised of either the nodal points or the linkages within the word segment. It should be understood, however, that the character string graph may be comprised of any graphical information regarding the visible features of the character string as long as the information representing the unique aspects of the character string is reproducible.

Method 900 goes on to operation 906 where all the common embedded isomorphic forms of the representative character string graph are extracted. As discussed above, the common embedded isomorphic forms are those embedded graphs that capture the essential defining characteristics of the character string being processed. In one embodiment, during the identification of the common embedded isomorphic forms, a threshold setting may be used. For example, the threshold may be set to extract only those embedded graphs that occupy more than 75 percent of the graph's structure of the original character string from which they were extracted. It should be appreciated, however, that this threshold setting is presented by way of example only in practice the threshold setting may be set to any value so long as the resulting common embedded graphs extracted retain the essential defining characteristics of the original character string graph. The full character string graph can be considered to be a common embedded graph taken at the 100 percent embedding threshold.

In one embodiment, the common embedded isomorphic graphs of a character string are extracted using an "isomorphic database". That is, a database where all the common embedded isomorphic forms of a graph having a particular topology may be stored. For example, during a lookup on the isomorphic database, a character string is first converted into a graph to generate an isomorphic key based on the nodal points and linkages in the graph. The isomorphic key is then matched to the isomorphic database to extract all the common embedded isomorphic graphs for the particular character string that does not fall below a threshold value. In another embodiment, an algorithm is applied to the character string to arrive at all the common embedded isomorphic forms. This is accomplished by the algorithm "toggling on" and "toggling off" certain features (e.g., edges, nodal points, etc.) of the character string graph in accordance with a threshold setting. This technique will produce 2" embedded graphs where "n" is the total number of graph features (nodes or strokes) in the graph. A threshold can be implemented using the physical dimensions of each edge and establishing a ratio of the aggregate lengths represented by the total number of edges toggled "off" or "zero" to the aggregate length of all edges in the entire graph. Thus, a threshold of 75 percent would include all embedded graphs that comprised "at least" 75 percent of the aggregate edge length entire graph.

Method 900 moves on to operation 908 where each of the extracted common embedded isomorphic graphs is converted into a digital ink file. In one embodiment, the common embedded isomorphic graphs are converted using a digital ink file database method as discussed above in FIG. 6A. Mainly, an isomorphic database key and a shape key are ascertained for each of the common embedded isomorphic graphs. Those keys are matched up against a digital ink file database to determine a stoke sequence for each of the common embedded isomorphic graphs. The stroke sequences are then used to generate a digital ink file for each of the common embedded isomorphic graphs.

In another embodiment, the common embedded isomorphic graphs are converted into digital ink files using an algorithm as described in FIG. 8. Mainly, the algorithm consists of a series of language heuristics that are applied against each of the common embedded isomorphic graphs to determine a stroke sequence for each of the graphs. Digital ink files are created for each of the common embedded isomorphic graphs using the stroke sequence determined for the graphs.

Method 900 proceeds to operation 910 where a Dynamic Recognition engine is used to identify the character string associated with each of the digital ink files. In one embodiment, the Dynamic Recognition engine is any conventional Dynamic Recognition engine available that can process the digital ink files. In another embodiment, the Dynamic Recognition engine used is keyed in to the specific language of the character string that the common embedded isomorphic graphs are extracted from. For example, a different Dynamic Recognition engine is used for character strings based on English than character stings based on Arabic.

The embodiments, described herein, can be practiced with other computer system configurations including hand-held devices, microprocessor systems, microprocessor-based or programmable consumer electronics, minicomputers, mainframe computers and the like. The embodiments can also be practiced in distributing computing environments where tasks are performed by remote processing devices that are linked through a network.

It should also be understood that the embodiments described herein can employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations that form part of the embodiments described herein are useful machine operations. The invention also relates to a device or an apparatus for performing these operations. The systems and methods described herein can be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The embodiments described herein can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Certain embodiments can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although a few embodiments of the present invention have been described in detail herein, it should be understood, by those of ordinary skill, that the present invention may be embodied in many other specific forms without departing from the spirit or scope of the invention. Therefore, the present examples and embodiments are to be considered as illustrative and not restrictive, and the invention is not to be limited to the details provided therein, but may be modified and practiced within the scope of the appended claims.

The invention claimed is:

1. A computer implemented method for converting an Arabic character string into digital ink files, where one or more processors are programmed to perform steps comprising:
    extracting the Arabic character string from a static document;
    converting the Arabic character string into a representative character string graph;
    extracting common embedded isomorphic graphs from the representative character string graph;
    generating an isomorphic database key for each of the common embedded isomorphic graphs extracted;
    ascertaining a shape key for each of the respective common embedded isomorphic graphs extracted using a data structure associated with each of the respective common embedded isomorphic graphs and a set of geometric measurements unique to each of the common embedded isomorphic graphs;
    utilizing the isomorphic database key and the shape key associated with each of the common embedded isomorphic graphs to create a digital ink database key for each of the common embedded isomorphic graphs;
    determining a stroke sequence for each of the common embedded isomorphic graphs by comparing the digital ink file database key associated with each of the common embedded isomorphic graphs against a digital ink file database; and
    building a digital ink file for each of the common embedded isomorphic graphs using the stroke sequence determined for each of the common embedded isomorphic graphs.

2. The computer implemented method for converting an Arabic character string into digital ink files, as recited in claim 1, wherein the set of geometric measurements is in the form of directional feature measurements of the common embedded isomorphic graphs.

3. The computer implemented method for converting an Arabic character string into digital ink files, as recited in claim 1, wherein the set of geometric measurements is in the form of feature vectors measured from the common embedded isomorphic graphs.

4. The computer implemented method for converting an Arabic character string into digital ink files, as recited in claim 1, further including:
    identifying nodal points and linkages on the representative character string graph; and
    ascertaining an isomorphic database key for the representative character string graph based on the identified nodal points and linkages.

5. The computer implemented method for converting an Arabic character string into digital ink files, as recited in claim 4, further including:
    utilizing the isomorphic database key to extract the common embedded isomorphic graphs of the representative character string graph from an isomorphic database.

6. The computer implemented method for converting an Arabic character string into digital ink files, as recited in claim 1, further including:
    utilizing an algorithm to extract the common embedded isomorphic graphs from the representative character string graph.

7. The computer implemented method for converting an Arabic character string into digital ink files, as recited in claim 1, wherein the digital ink file is built in a universal format.

8. A computer implemented method for converting an Arabic character string into digital ink, where one or more processors are programmed to perform steps comprising:
    extracting the Arabic character string from a static document;
    converting the Arabic character string into a representative character string graph;
    extracting common embedded isomorphic graphs from the representative character string graph;
    determining a stroke sequence for each of the common embedded isomorphic graphs extracted using an algorithm; and
    creating a digital ink file for each of the common embedded isomorphic graphs using the stroke sequence determined for each of the common embedded isomorphic graphs.

9. The computer implemented method for converting an Arabic character string into digital ink, as recited in claim 8, wherein the algorithm is based upon language heuristics of Arabic.

10. The computer implemented method for converting an Arabic character string into digital ink files, as recited in claim 8, further including:
    identifying nodal points and linkages on the representative character string graph; and
    ascertaining an isomorphic database key for the representative character string graph based on the identified nodal points and linkages.

11. The computer implemented method for converting an Arabic character string into digital ink files, as recited in claim 10, further including:
    utilizing the isomorphic database key to extract the common embedded isomorphic graphs of the representative character string graph from an isomorphic database.

12. The computer implemented method for converting an Arabic character string into digital ink files, as recited in claim 8, further including:
    utilizing an algorithm to extract the common embedded isomorphic graphs from the representative character string graph.

13. A computer implemented method for recognizing an Arabic character string on a static document, where one or more processors are programmed to perform steps comprising:
    extracting the Arabic character string from the static document;
    converting the Arabic character string into a representative character string graph;
    extracting common embedded isomorphic graphs of the representative character string graph;
    converting each of the common embedded isomorphic graphs extracted into digital ink files; and
    identifying the Arabic character string associated with each of the digital ink files using a dynamic recognition system.

14. The computer implemented method for recognizing an Arabic character string on a static document, as recited in claim 13, further including:
    identifying nodal points and linkages on the representative character string graph; and
    ascertaining an isomorphic database key for the representative character string graph based on the identified nodal points and linkages.

15. The computer implemented method for recognizing an Arabic character string on a static document, as recited in claim 14, further including:
    utilizing the isomorphic database key to extract the common embedded isomorphic graphs of the representative character string graph from an isomorphic database.

16. The computer implemented method for recognizing an Arabic character string on a static document, as recited in claim 13, further including:
    utilizing an algorithm to extract the common embedded isomorphic graphs from the representative character string graph.

17. The computer implemented method for recognizing an Arabic character string on a static document, as recited in claim 13, wherein the dynamic recognition system is configured to utilize stroke sequence information stored within the digital ink files to identify the Arabic character string associated with each of the digital ink files.

18. The computer implemented method for recognizing an Arabic character string on a static document, as recited in claim 13, wherein each of the common embedded isomorphic graphs extracted are converted into the digital ink files using an algorithm.

19. The computer implemented method for recognizing an Arabic character string on a static document, as recited in claim 18, wherein the algorithm is based upon language heuristics of Arabic.

20. The computer implemented method for recognizing an Arabic character string on a static document, as recited in claim 13, further including:
    ascertaining a shape key for each of the respective common embedded isomorphic graphs extracted using a data structure associated with each of the respective common embedded isomorphic graphs and a set of geometric measurements unique to each of the common embedded isomorphic graphs;
    utilizing the isomorphic database key and the shape key associated with each of the common embedded isomorphic graphs to create a digital ink database key for each of the common embedded isomorphic graphs;
    determining a stroke sequence for each of the common embedded isomorphic graphs by comparing the digital ink file database key associated with each of the common embedded isomorphic graphs against a digital ink file database; and
    building a digital ink file for each of the common embedded isomorphic graphs using the stroke sequence determined for each of the common embedded isomorphic graphs.

21. The computer implemented method for recognizing an Arabic character string on a static document, as recited in claim 20, wherein the set of geometric measurements is in the form of feature vectors measurements of the common embedded isomorphic graphs.

22. The computer implemented method for recognizing an Arabic character string on a static document, as recited in claim 20, wherein the set of geometric measurements is in the form of directional feature measurements of the common embedded isomorphic graphs.

23. A computer implemented method for converting a character string into digital ink, where one or more processors are programmed to perform steps comprising:
    extracting the character string from a static document;
    converting the character string into a representative character string graph;
    extracting common embedded isomorphic graphs from the representative character string graph;
    generating an isomorphic database key for each of the common embedded isomorphic graphs extracted;
    ascertaining a shape key for each of the respective common embedded isomorphic graphs extracted using a data structure associated with each of the respective common embedded isomorphic graphs and a set of geometric measurements unique to each of the common embedded isomorphic graphs;
    utilizing the isomorphic database key and the shape key associated with each of the common embedded isomorphic graphs to create a digital ink database key for each of the common embedded isomorphic graphs;
    determining a stroke sequence for each of the common embedded isomorphic graphs by comparing the digital ink file database key associated with each of the common embedded isomorphic graphs against a digital ink file database; and
    building a digital ink file for each of the common embedded isomorphic graphs using the stroke sequence determined for each of the common embedded isomorphic graphs.

24. The computer implemented method for converting a character string into digital ink, as recited in claim 23, wherein the set of geometric measurements is in the form of directional feature measurements of the common embedded isomorphic graphs.

25. The computer implemented method for converting a character string into digital ink files, as recited in claim 23, wherein the set of geometric measurements is in the form of feature vectors measurements of the common embedded isomorphic graphs.

26. The computer implemented method for converting a character string into digital ink files, as recited in claim 23, further including:
    identifying nodal points and linkages on the representative character string graph; and ascertaining an isomorphic database key for the representative character string graph based on the identified nodal points and linkages.

27. The computer implemented method for converting a character string into digital ink files, as recited in claim 26, further including:
utilizing the isomorphic database key to extract the common embedded isomorphic graphs of the representative character string graph from an isomorphic database.

28. The computer implemented method for converting a character string into digital ink files, as recited in claim 23, further including:
utilizing an algorithm to extract the common embedded isomorphic graphs from the representative character string graph.

29. The computer implemented method for converting a character string into digital ink files, as recited in claim 23, wherein the digital ink files are built in a universal format.

30. A computer implemented method for converting a character string into digital ink, where one or more processors are programmed to perform steps comprising:
extracting the character string from a static document;
converting the character string into a representative character string graph;
extracting common embedded isomorphic graphs from the representative character string graph;
determining a stroke sequence for each of the common embedded isomorphic graphs extracted using an algorithm; and
creating a digital ink file for each of the common embedded isomorphic graphs using the stroke sequence determined for each of the common embedded isomorphic graphs.

31. The computer implemented method for converting a character string into digital ink, as recited in claim 30, wherein the algorithm is based upon language heuristics of languages used to form the character string.

32. The computer implemented method for converting a character string into digital ink files, as recited in claim 30, further including:
identifying nodal points and linkages on the representative character string graph; and
ascertaining an isomorphic database key for the representative character string graph based on the identified nodal points and linkages.

33. The computer implemented method for converting a character string into digital ink files, as recited in claim 32, further including:
utilizing the isomorphic database key to extract the common embedded isomorphic graphs of the representative character string graph from an isomorphic database.

34. The computer implemented method for converting a character string into digital ink files, as recited in claim 30, further including:
utilizing an algorithm to extract the common embedded isomorphic graphs from the representative character string graph.

35. A computer implemented method for recognizing a character string on a static document, where one or more processors are programmed to perform steps comprising:
extracting the character string from the static document;
converting the character string into a representative character string graph;
extracting common embedded isomorphic graphs of the representative character string graph;
extracting common embedded isomorphic graphs of the representative character string graph;
converting each of the common embedded isomorphic graphs extracted into digital ink files; and
identifying the character string associated with each of the digital ink files using a dynamic recognition system.

36. The computer implemented method for recognizing a character string, as recited in claim 35, further including:
identifying nodal points and linkages on the representative character string graph; and
ascertaining an isomorphic database key for the representative character string graph based on the identified nodal points and linkages.

37. The computer implemented method for recognizing a character string, as recited in claim 36, further including:
utilizing the isomorphic database key to extract the common embedded isomorphic graphs of the representative character string graph from an isomorphic database.

38. The computer implemented method for recognizing a character string, as recited in claim 35, further including:
utilizing an algorithm to extract the common embedded isomorphic graphs from the representative character string graph.

39. The computer implemented method for recognizing a character string, as recited in claim 35, wherein the dynamic recognition system is configured to utilize stroke sequence information stored within the digital ink files to identify the character string associated with each of the digital ink files.

40. The computer implemented method for recognizing a character string, as recited in claim 35, wherein each of the common embedded isomorphic graphs extracted are converted into the digital ink files using an algorithm.

41. The computer implemented method for recognizing a character string, as recited in claim 40, wherein the algorithm is based upon language heuristics of languages used to form the character string.

42. The computer implemented method for recognizing a character string, as recited in claim 35, further including:
ascertaining a shape key for each of the respective common embedded isomorphic graphs extracted using a data structure associated with each of the respective common embedded isomorphic graphs and a set of geometric measurements unique to each of the common embedded isomorphic graphs;
utilizing the isomorphic database key and the shape key associated with each of the common embedded isomorphic graphs to create a digital ink database key for each of the common embedded isomorphic graphs;
determining a stroke sequence for each of the common embedded isomorphic graphs by comparing the digital ink file database key associated with each of the common embedded isomorphic graphs against a digital ink file database; and
building a digital ink file for each of the common embedded isomorphic graphs using the stroke sequence determined for each of the common embedded isomorphic graphs.

43. The computer implemented method for recognizing a character string, as recited in claim 42, wherein the set of geometric measurements is in the form of feature vectors measurements of the common embedded isomorphic graphs.

44. The computer implemented method for recognizing a character string, as recited in claim 42, wherein the set of geometric measurements is in the form of directional feature measurements of the common embedded isomorphic graphs.

45. A computing device comprising at least one processor communicatively coupled with at least one computer readable storage medium, wherein the processor is programmed to convert a character string into digital ink, by performing the steps of:

extracting the character string from a static document;

converting the character string into a representative character string graph;

extracting common embedded isomorphic graphs from the representative character string graph;

generating an isomorphic database key for each of the common embedded isomorphic graphs extracted;

ascertaining a shape key for each of the respective common embedded isomorphic graphs extracted using a data structure associated with each of the respective common embedded isomorphic graphs and a set of geometric measurements unique to each of the common embedded isomorphic graphs;

utilizing the isomorphic database key and the shape key associated with each of the common embedded isomorphic graphs to create a digital ink database key for each of the common embedded isomorphic graphs;

determining a stroke sequence for each of the common embedded isomorphic graphs by comparing the digital ink file database key associated with each of the common embedded isomorphic graphs against a digital ink file database; and building a digital ink file for each of the common embedded isomorphic graphs using the stroke sequence determined for each of the common embedded isomorphic graphs.

46. The computing device for converting a character string into digital ink, as recited in claim 45, wherein the set of geometric measurements is in the form of directional feature measurements of the common embedded isomorphic graphs.

47. The computing device for converting a character string into digital ink files, as recited in claim 45, wherein the set of geometric measurements is in the form of feature vectors measurements of the common embedded isomorphic graphs.

48. The computing device for converting a character string into digital ink files, as recited in claim 45, wherein the processor is further programmed to perform the steps of:

identifying nodal points and linkages on the representative character string graph; and ascertaining an isomorphic database key for the representative character string graph based on the identified nodal points and linkages.

49. The computing device for converting a character string into digital ink files, as recited in claim 48, wherein the processor is further programmed to perform the steps of:

utilizing the isomorphic database key to extract the common embedded isomorphic graphs of the representative character string graph from an isomorphic database.

50. The computing device for converting a character string into digital ink files, as recited in claim 45, wherein the processor is further programmed to perform the steps of:

utilizing an algorithm to extract the common embedded isomorphic graphs from the representative character string graph.

51. The computing device for converting a character string into digital ink files, as recited in claim 45, wherein the digital ink file is built in a universal format.

52. A computing device comprising at least one processor communicatively coupled with at least one computer readable storage medium, wherein the processor is programmed to convert a character string into digital ink by performing the steps of:

extracting the character string from a static document;

converting the character string into a representative character string graph;

extracting common embedded isomorphic graphs from the representative character string graph;

determining a stroke sequence for each of the common embedded isomorphic graphs extracted using an algorithm; and creating a digital ink file for each of the common embedded isomorphic graphs using the stroke sequence determined for each of the common embedded isomorphic graphs.

53. The computing device for converting a character string into digital ink, as recited in claim 52, wherein the algorithm is based upon language heuristics of languages used to form the character string.

54. The computing device for converting a character string into digital ink files, as recited in claim 52, wherein the processor is further programmed to perform the steps of:

identifying nodal points and linkages on the representative character string graph; and ascertaining an isomorphic database key for the representative character string graph based on the identified nodal points and linkages.

55. The computing device for converting a character string into digital ink files, as recited in claim 54, wherein the processor is further programmed to perform the steps of:

utilizing the isomorphic database key to extract the common embedded isomorphic graphs of the representative character string graph from an isomorphic database.

56. The computing device for converting a character string into digital ink files, as recited in claim 52, wherein the processor is further programmed to perform the steps of:

utilizing an algorithm to extract the common embedded isomorphic graphs from the representative character string graph.

57. A computing device comprising at least one processor communicatively coupled with at least one computer readable storage medium, wherein the processor is programmed to execute a character string recognition process by performing the steps of:

extracting the character string from a static document;

converting the character string into a representative character string graph;

extracting common embedded isomorphic graphs of the representative character string graph;

converting each of the common embedded isomorphic graphs extracted into digital ink files; and identifying the character string associated with each of the digital ink files using a dynamic recognition system.

58. The computing device for recognizing a character string, as recited in claim 57, wherein the processor is further programmed to perform the steps:

identifying nodal points and linkages on the representative character string graph; and ascertaining an isomorphic database key for the representative character string graph based on the identified nodal points and linkages.

59. The computing device for recognizing a character string, as recited in claim 58, wherein the processor is further programmed to perform the steps of:

utilizing the isomorphic database key to extract the common embedded isomorphic graphs of the representative character string graph from an isomorphic database.

60. The computing device for recognizing a character string, as recited in claim 57, wherein the processor is further programmed to perform the steps of:

utilizing an algorithm to extract the common embedded isomorphic graphs from the representative character string graph.

61. The computing device for recognizing a character string, as recited in claim 57, wherein the dynamic recognition system is configured to utilize stroke sequence information stored within the digital ink files to identify the character string associated with each of the digital ink files.

62. The computing device for recognizing a character string, as recited in claim 57, wherein each of the common embedded isomorphic graphs extracted are converted into the digital ink files using an algorithm.

63. The computing device for recognizing a character string, as recited in claim 62, wherein the algorithm is based upon language heuristics of languages used to form the character string.

64. The computing device for recognizing a character string, as recited in claim 57, wherein the processor is further programmed to perform the steps of:

ascertaining a shape key for each of the respective common embedded isomorphic graphs extracted using a data structure associated with each of the respective common embedded isomorphic graphs and a set of geometric measurements unique to each of the common embedded isomorphic graphs;

utilizing the isomorphic database key and the shape key associated with each of the common embedded isomorphic graphs to create a digital ink database key for each of the common embedded isomorphic graphs;

determining a stroke sequence for each of the common embedded isomorphic graphs by comparing the digital ink file database key associated with each of the common embedded isomorphic graphs against a digital ink file database; and building a digital ink file for each of the common embedded isomorphic graphs using the stroke sequence determined for each of the common embedded isomorphic graphs.

65. The computing device for recognizing a character string, as recited in claim 64, wherein the set of geometric measurements is in the form of feature vectors measurements of the common embedded isomorphic graphs.

66. The computing device for recognizing a character string, as recited in claim 65, wherein the set of geometric measurements is in the form of directional feature measurements of the common embedded isomorphic graphs.

* * * * *